United States Patent Office 3,288,714
Patented Nov. 29, 1966

3,288,714
LUBRICATING OIL COMPOSITIONS CONTAINING ALKENYL SUCCINIC ANHYDRIDES
Carl Osuch, Dubuque, Iowa, assignor to Monsanto Company, St. Louis, Mo., a corporation of Delaware
No Drawing. Original application Dec. 6, 1961, Ser. No. 157,575. Divided and this application Jan. 14, 1965, Ser. No. 425,630
6 Claims. (Cl. 252—57)

This application is a division of application Serial No. 157,575, filed December 6, 1961, and now abandoned.

This invention relates to alkenyl succinic anhydrides wherein the alkenyl group has a molecular weight of from about 900 to about 2000. Thus, the compounds of this invention can be represented by the structure,

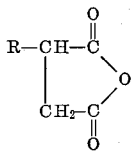

where R has a molecular weight of from 900 to 2000.

Under the conditions encountered in a large percentage of present-day automobile driving (i.e., the so-called stop-and-go driving), automobile engines do not attain their most desirable and efficient operating temperatures. As a result, large quantities of oil-insoluble oxidation products are formed which eventually find their way into the crankcase, where they tend to deposit on the internal parts of the engine, resulting in further inefficient engine operation.

In present-day practice, deposition of the oxidation products is minimized by incorporating into lubricating oils metal-containing detergents. The use of metal-containing detergents, however, has not been totally satisfactory since such detergents form ash deposits in the combustion chambers of engines, fouling the spark plugs and creating other problems.

It has now been found that the problems associated with the use of metal-containing detergents can be avoided by the use of certain new ashless detergents-dispersants which are alkenyl succinic anhydrides wherein the alkenyl group has a molecular weight of from about 900 to about 2000.

The alkenyl succinic anhydrides to which this invention pertains can be prepared by heating maleic anhydride with an olefin polymer having the required molecular weight at temperatures of about 150° C. to 250° C. in molar ratios of from about 1:1 to about 5:1, respectively. Suitable olefin polymers are the polymers of the lower alkenes; e.g., polymers of ethylene, propylene, butylene, isobutylene, amylene, and mixtures thereof, having a molecular weight of from about 900 to about 2000. Since the reaction between the olefin polymer and maleic anhydride may not go to completion, the resulting alkenyl succinic anhydride can contain some unreacted olefin polymer which can be allowed to remain since it has no undesirable effects.

Lubricating oils which can be used as the base oils to which the new compounds of this invention are added are not limited as far as the detergent-dispersant effects of the alkenyl succinic anhydrides are concerned, and, accordingly, lubricating oils which are of a naphthenic base, paraffin base, and other hydrocarbon bases, as well as lubricating oils derived from coal products and synthetic oils, such as the alkylene polymers, alkylene oxide polymers, dicarboxylic acid esters, alkylated benzenes, silicate esters, silicon polymers, and the like, are suitable.

The alkenyl succinic anhydrides of this invention can be used in lubricating oils in amounts of from about 0.05% to about 25% by weight. It has been found, however, that for most applications, amounts of from about 0.5% to about 10% by weight are sufficient.

The preparation of a typical alkenyl succinic anhydride of this invention is illustrated in the following non-limiting example, wherein parts are parts by weight. The number in parentheses after the name of a polyalkenyl radical is the approximate molecular weight of said radical.

EXAMPLE 1

Into a one-liter Parr autoclave having a mechanical agitator, heating means, and temperature-measuring means there were charged 52 parts of maleic anhydride and 210 parts of polyisobutylene (M.W. 940). The resulting mixture was heated, with agitation, for about three and one-half hours at temperatures in the range of about 210° C. to 240° C. Thereafter the reaction product was stripped at reduced pressure to remove unreacted maleic anhydride, and filtered to yield polybutenyl (940) succinic anhydride. Infrared analysis of this material showed the expected absorption for a cyclic anhydride at 1,870 cm.$^{-1}$ (5.35 microns) and 1,780 cm.$^{-1}$ (5.6 microns).

Other alkenyl succinic anhydrides of this invention can be prepared in a similar manner, examples of which are polyethenyl succinic anhydride, polypropenyl succinic anhydride, other polybutenyl succinic anhydrides, and polypentenyl succinic anhydride, in all of which the molecular weight of the alkenyl group can range from about 900 to about 2000.

Two screening tests were utilized to demonstrate the detergency and/or dispersancy effectiveness in gasoline engine oil formulations of the compounds of this invention. One test, referred to as the "Lacquer Deposition" test, consists in passing burned gasoline fumes through a sample of a formulation in a suitable container under controlled conditions, after which the sample is aged in an oven. The amount of deposit is then determined by washing away the oil. A control formulation is run simultaneously. The figure reported represents the percent reduction in deposits when a test compound is present as compared to the amount of deposit when no such compound is present.

An additional test utilized, referred to as the "Carbon Shaking" test, involves the addition of 2% of the additive under test to a mixture of lampblack and hydrocarbon, shaking the resulting mixture, and then allowing the mixture to stand for 24 hours. The liquid layer is then observed and rated as opaque; heavy, medium, or light haze; or clear. A good detergent-dispersant should give a heavy haze or opaque rating.

Utilizing the above tests, the results presented in Table I, below, were observed.

Table I

| Test No. | Alkenyl Group of Alkenyl Succinic Anhydride | Lacquer Deposition | Carbon Shaking |
|---|---|---|---|
| 1 | Polybutenyl (M.W. 940) | 76 | Heavy Haze. |
| 2 | Polybutenyl (M.W. 1,330) | 35 | Opaque. |
| 3 | Polybutenyl (M.W. 1,500) | 48 | Opaque. |

It should be noted that some alkenyl succinic anhydrides not within the scope of this invention will give some indication of activity in one of the above-described screening tests. However, engine testing has shown that, unless both tests show activity, a candidate material does not, in fact, have any practical utility as a detergent and/or dispersant.

In Table II, below, data are presented which were obtained from an FL–2 (CRC) test on a composition containing the product of Example 1. As known to those working in the art, the FL-2 (CRC) test is a test designed to measure sludge, varnish deposits, and oil ring plugging caused by engine operation at moderate oil temperatures. In the test, a 216 cubic inch, 6 cylinder Chevrolet engine is operated at 2500 r.p.m. for 40 hours, dismantled, and rated as described below.

The piston varnish rating is a visual rating of the amount of varnish on the skirt of a piston, with a rating of 10 representing a perfectly clean piston and a rating of 0 representing a piston fully covered with varnish. After each piston is rated, the ratings are averaged and the average rating reported.

The oil ring rating signifies the extent of oil ring plugging, with a rating of 10 representing no plugging and a rating of 0 representing complete plugging. After each piston is rated, the ratings are averaged and the average rating reported.

The total rating is the over-all deposit rating obtained by observing engine deposits at key points, such as on the push rod cover, the oil screen, the top deck, etc. Ratings range from 100 for a perfectly clean engine to 0 as the engine gets dirtier.

The formulation tested had the following composition.

| Formulation: | Percent by weight |
|---|---|
| Solvent-refined Mid-Continent, SAE 30 oil | 97.05 |
| Zinc salt of a mixed alkyl phosphorodithioate | 0.95 |
| Polybutenyl succinic anhydride | 2.0 |

Table II

| | |
|---|---|
| Piston varnish | 9.2 |
| Oil ring | 10.0 |
| Total rating | 92.1 |

From the above, it is clear that the addition to lubricating oils of the alkenyl succinic anhydrides of the present invention brings with it a clear improvement of the dispersing and/or detergent qualities of said oils. Nevertheless, the greater part of the commercial lubricating oils sold today is subject to a large number of uses, and it is therefore generally necessary to employ more than one type of additive in a finished lubricant composition. Thus, although the products of the present invention are effective detergents-dispersants, particularly for low temperature operations, it is frequently necessary to use said products in combination with other types of additives, such as metal-containing detergents and/or dispersants, corrosion inhibitors, oxidation inhibitors, extreme pressure agents, viscosity index improvers, pour-point depressors, antifoaming agents, and the like.

A particularly useful combination of additives intended to be applied in motor lubricants is the combination of an alkenyl succinic anhydride of the present invention and metal-containing derivatives of phosphorus, such as metal phosphorodithioates; e.g., zinc dihexyl phosphorodithioate, the zinc salt of mixed alkyl phosphorodithioates where the alkyl groups are obtained, for example, from an equal mixture of isobutyl and n-amyl alcohols, and the metal salts (e.g., barium) of phosphorus sulfide-olefin polymeric reaction products.

While this invention has been described with reference to various specific examples and embodiments, it is understood that the invention is not limited thereto and that it can be variously practiced within the scope of the following claims.

What is claimed is:

1. A composition comprising a lubricating oil and from about 0.05% to about 25% by weight of alkenyl succinic anhydrides wherein the alkenyl group has a molecular weight of from about 900 to about 2000 and is a polymer of a lower alkene.

2. A composition comprising a lubricating oil and from about 0.05% to about 25% by weight of polybutenyl succinic anhydrides wherein the polybutenyl group has a molecular weight of from about 900 to about 2000.

3. A composition comprising a lubricating oil and from about 0.5% to about 25% by weight of polypropenyl succinic anhydrides wherein the polypropenyl group has a molecular weight of from about 900 to about 2000.

4. A composition comprising a lubricating oil and from about 0.05% to about 25% by weight of a polybutenyl succinic anhydride wherein the polybutenyl group has a molecular weight of about 940.

5. A composition comprising a lubricating oil and from about 0.05% to about 25% by weight of a polybutenyl succinic anhydride wherein the polybutenyl group has a molecular weight of about 1330.

6. A composition comprising a lubricating oil and from about 0.05% to about 25% by weight of a polybutenyl succinic anhydride wherein the polybutenyl group has a molecular weight of about 1500.

References Cited by the Examiner

UNITED STATES PATENTS

| 2,133,734 | 10/1928 | Moser et al. | 252—56 |
| 2,368,602 | 1/1945 | Weiss | 252—56 |
| 2,805,994 | 9/1957 | Liehe et al. | 252—56 X |
| 3,234,186 | 2/1966 | Agius et al. | 252—56 |

DANIEL E. WYMAN, *Primary Examiner.*

W. H. CANNON, *Assistant Examiner.*